United States Patent
Na et al.

(10) Patent No.: US 7,152,119 B2
(45) Date of Patent: Dec. 19, 2006

(54) APPARATUS AND METHOD FOR ALLOCATING IP ADDRESSES TO NETWORK INTERFACE CARD

(75) Inventors: Chung-seob Na, Suwon-si (KR); Seong-jin Ahn, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 820 days.

(21) Appl. No.: 10/234,721

(22) Filed: Sep. 5, 2002

(65) Prior Publication Data

US 2003/0069993 A1   Apr. 10, 2003

(30) Foreign Application Priority Data

Sep. 5, 2001   (KR) .......................... 2001-0054457

(51) Int. Cl.
   *G06F 15/16*   (2006.01)
   *H04L 12/28*   (2006.01)
(52) U.S. Cl. .................. 709/245; 709/230; 370/420
(58) Field of Classification Search .............. None
See application file for complete search history.

(56) References Cited

U.S. PATENT DOCUMENTS 5,590,285 A * 12/1996 Krause et al. .............. 709/218
6,101,616 A *  8/2000 Joubert et al. .............. 714/11

FOREIGN PATENT DOCUMENTS

| JP | 7-245619 A | 9/1995 |
|---|---|---|
| JP | 10-65723 A | 3/1998 |
| JP | 10-135982 A | 5/1998 |
| JP | 11-205356 A | 7/1999 |
| JP | 2000-29806 A | 1/2000 |

* cited by examiner

*Primary Examiner*—Wen-Tai Lin
(74) *Attorney, Agent, or Firm*—Sughrue Mion, PLLC

(57) ABSTRACT

A method and a host for allocating a plurality of Internet Protocol (IP) addresses to a Network Interface Card (NIC) which has a unique Media Access Control (MAC) address comprising vendor code and serial code is provided. The method for allocating multiple IP addresses to the NIC in a host includes: setting up a virtual MAC address by combining a virtual vendor code and a serial code; mapping the virtual MAC address with one of internal addresses of actual IP addresses allocated to a host; and allocating the mapped internal address and the virtual MAC address to an application that requests an IP protocol. Since a plurality of IP addresses can be allocated to one NIC in the IP address allocation method, as many NICs as required IP addresses are not necessary and cost-effectiveness can be achieved.

3 Claims, 2 Drawing Sheets

APPARATUS AND METHOD FOR ALLOCATING IP ADDRESSES TO NETWORK INTERFACE CARD

BACKGROUND OF THE INVENTION

1. Field of the Invention

The present invention relates to a method for allocating addresses to a Network Interface Card (NIC) included in a host that uses a Transmission Control Protocol (TCP)/ Internet Protocol (IP) in a Local Area Network (LAN) environment, and more particularly, to an apparatus and a method for allocating a plurality of IP addresses to one NIC. The present application is based on Korean Patent Application No. 2001-54457, filed Sep. 5, 2001, which is incorporated herein by reference.

2. Description of the Related Art

A Network Interface Card (NIC) is necessary to access an Ethernet. The NIC accesses an Ethernet using a unique Media Access Control (MAC) address allocated in a manufacturing stage while a host has its own Internet Protocol (IP) address corresponding to a hostname.

The MAC address is a physical identity (hardware address) necessary to identify a computer or equipment connected in a Local Area Network (LAN) and is used as an Ethernet address in the Ethernet LAN. An IP address (logical address) is used to transmit packet data over the Internet. However, if the data arrives at a destination LAN, the IP address should be converted into the MAC address so that a destination host can receive the data.

The MAC address is used in a MAC layer, which is a sublayer of a Data Link Control (DLC) layer in a communication protocol.

If a user has a computer running Windows (Windows is a trademark of Microsoft.), he can identify the IP address and the MAC address by entering "winipcfg" after selecting a Start menu and an Execution menu.

When the TCP/IP protocol is used to access the Ethernet, the IP address needs to be converted into the MAC address. Then, actual IP addresses and actual MAC addresses are mapped to each other.

Therefore, if the number of IP addresses necessary for the host is N, the number of required NICs is also N.

FIG. 1 is a block diagram showing the configuration of an apparatus that accesses the Ethernet in a conventional address allocation method. In FIG. 1, the upper part of the thick solid line shows subsystems in a host while the lower part shows subsystems included in an opposite host.

A File Transfer Protocol (FTP) processor 102 converts a hostname into an IP address of 32 bits using a Domain Name System (DNS) and then, attempts to access a Transmission Control Protocol (TCP) processor 104 using the given IP address. The TCP processor 104 converts the connection request segment into an IP datagram for transmission to an IP processor 106.

If the opposite host is in a local network in an IP layer, the IP datagram is transmitted to the opposite host through the local network directly. If the opposite host is in a remote network, the IP datagram is transmitted to the next router by means of the IP routing function.

The IP datagram refers to a unit of data transmitted or received in the IP layer and corresponds to the packet in the Ethernet.

Since the Ethernet uses an address of 48 bits, an IP address of 32 bits should be converted into an address of 48 bits by an Address Resolution Protocol (ARP).

An ARP processor 108 converts the IP address of 32 bits into the Ethernet address of 48 bits, and vice versa. If the host 100 transmits data to the opposite host, the ARP processor 108 broadcasts the Arp Request Frame to all the hosts.

The ARP processor 118 of the opposite host receives the Arp Request Frame transmitted by the ARP processor 108 and, as a response, transmits the Arp Reply Frame including its own hardware address (Ethernet address) to the ARP processor 108.

If the ARP processor 108 receives the Arp Reply Frame transmitted by the ARP processor 118 of the opposite host, it prepares for transmitting the IP datagram. Then, the IP datagram is transmitted to the opposite host.

The Ethernet driver 110 corresponds to an NIC and transmits data in a physical layer.

Each NIC has its own Ethernet address of 48 bits while a host has one IP address of 32 bits. Actual IP addresses and actual MAC addresses are mapped to each other.

As a result, the existing address allocation method is not cost-effective in that the N IP addresses required in a host necessitate the same number of NICs.

SUMMARY OF THE INVENTION

To solve the above-described problems, it is an object of the present invention to provide a method for allocating a plurality of Internet Protocol (IP) addresses to a Network Interface Card (NIC).

Another objective of the present invention is to provide an appropriate apparatus to allocate the addresses.

To achieve the above objective, a method for allocating multiple IP addresses to an NIC according to the present invention includes:

setting up a virtual Media Access Control (MAC) address by combining a virtual vendor code and a serial code;

mapping the virtual MAC address with one of internal addresses of actual IP addresses allocated to a host; and allocating the mapped internal address and the virtual MAC address to an application that requests an IP protocol.

To achieve another objective, a host that accesses the Ethernet using the NIC according to the present invention includes;

an IP processor for having a controller that has an IP/MAC table where there are mapped virtual MAC address and one of internal addresses of actual IP addresses; and the controller for allocating the virtual MAC address and the internal address of actual IP addresses listed in the IP/MAC table in response to an IP address request from the IP processor.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

The operation and structure of the present invention will be described in detail with reference to the attached drawing.

Figure 2:
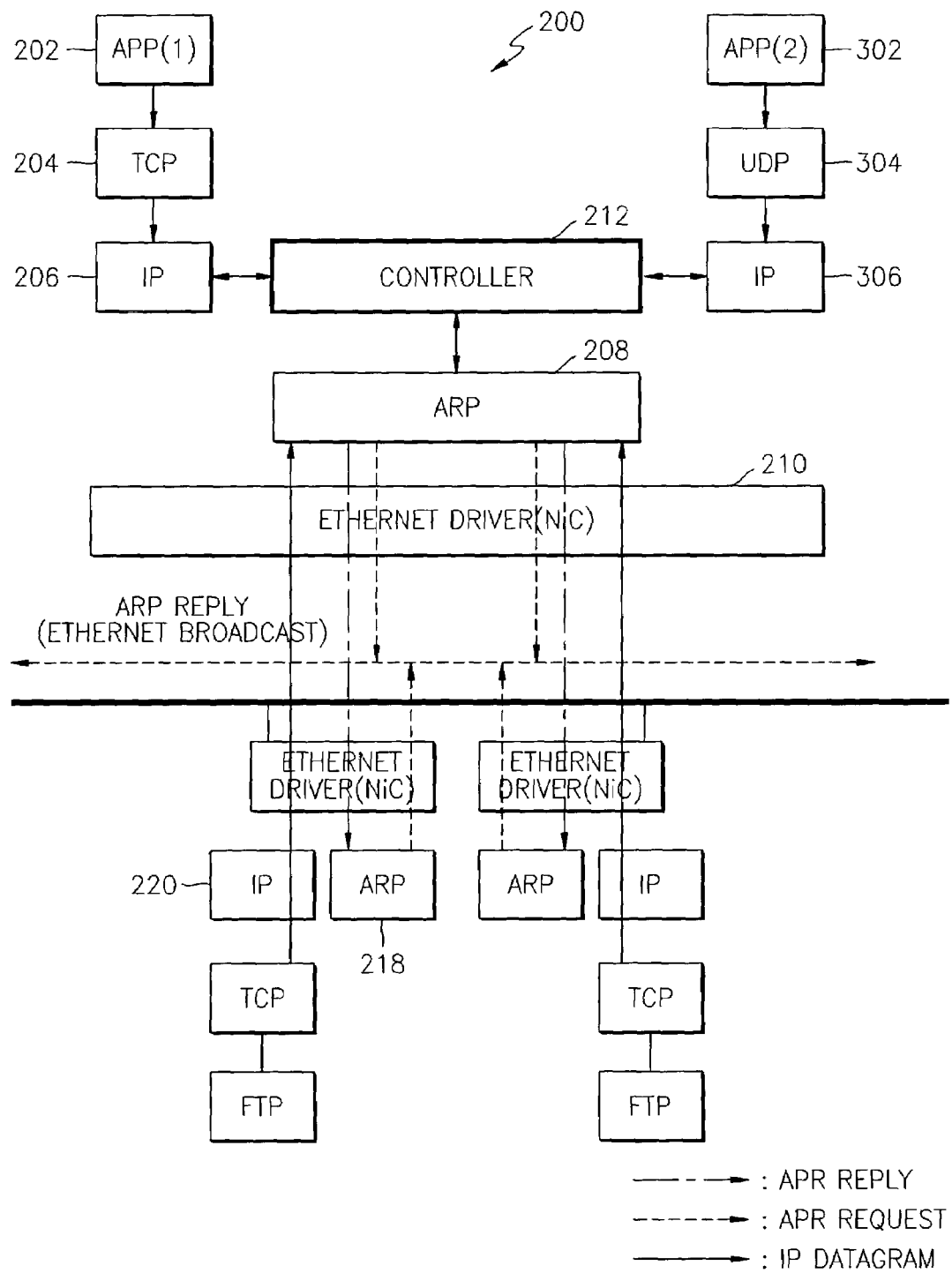
FIG. 2 is a block diagram showing the configuration of a host that uses the address allocation method according to the present invention.

FIG. 2 is a block diagram showing the configuration of an apparatus that allocates addresses according to the present invention.

In FIG. 2, the upper part of the thick solid line shows subsystems in a host 200 while the lower part shows subsystems in an opposite host.

App1 202 and App2 302 are application programs run in the host 200.

The application programs 202 and 302 access the Ethernet using their own IP addresses.

Figure 1:
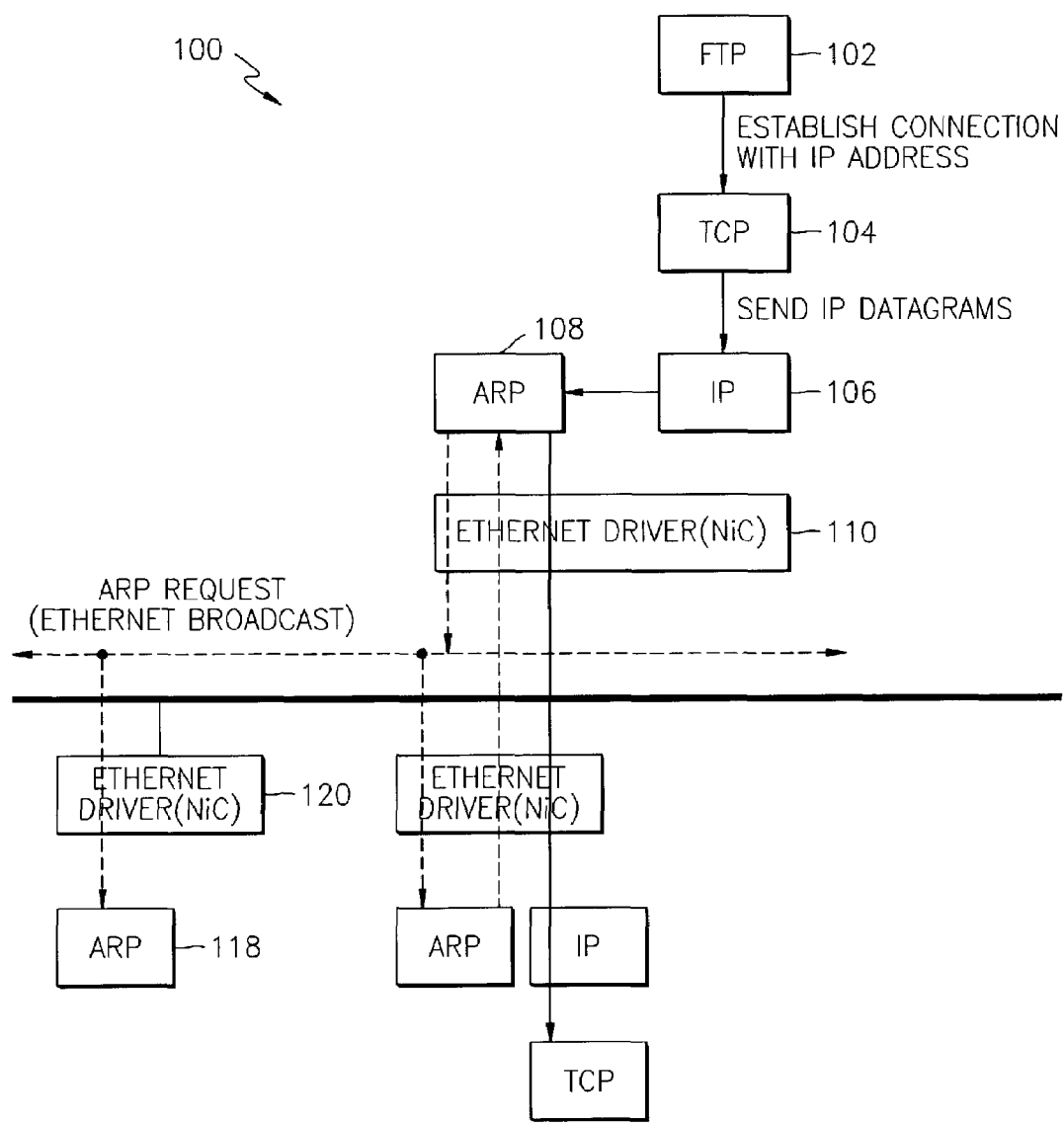
FIG. 1 is a block diagram showing the configuration of a host that accesses the Ethernet in an existing address allocation method.

A File Transfer Protocol (FTP) processor (corresponding to the FTP processor 102 shown in FIG. 1) included in the application program 202 converts a hostname into an IP address of 32 bits using a Domain Name System (DNS). Then, the FTP processor attempts to access a Transmission Control Protocol (TCP) processor 204 using the given Internet Protocol (IP) address. The TCP processor 204 converts the connection request segment into the IP frame for transmission to the IP processor 206.

The application program 302 accesses the Ethernet using its own IP address through a User Datagram Protocol (UDP) processor 302 and an IP processor 306.

The ARP processor 208 converts the IP address of 32 bits into the Ethernet address of 48 bits and vice versa. If a host 200 transmits data to an opposite host, the ARP processor 208 broadcasts the Arp Request Frame to all the hosts.

The Ethernet driver 210 corresponds to an NIC and transmits data in a physical layer.

The ARP processor 218 of the opposite host receives the Arp Request Frame provided by the ARP processor 208 and as a response, transmits the Arp Reply Frame including its own hardware address to the ARP processor 208.

If the ARP processor 208 receives the Arp Reply Frame transmitted by the ARP processor 218 of the opposite host, it prepares to transmit the IP datagram. Then, the IP datagram is transmitted to the opposite host.

In the apparatus shown in FIG. 2, the application programs 202 and 302 use different IP addresses. In addition, the NIC uses a separate IP address. Therefore, three IP addresses are allocated to one NIC that has one Ethernet address.

The controller 212 controls allocation of 3 IP addresses to one Ethernet address allocated in the NIC using the IP/MAC table.

According to the present invention, the address allocation is performed in the following manner.

A virtual vendor code and a serial code are combined to set up a virtual MAC address.

The virtual MAC address is mapped to one of internal addresses of actual IP addresses allocated to the host. The virtual MAC address and the internal addresses of the actual IP addresses allocated to the host are saved in the IP/MAC table.

The mapped internal address and the virtual MAC address are allocated to an application that requests an IP protocol.

Table 1 shows one example of the IP/MAC table used by the controller 212.

TABLE 1

|  | IP (32 bits) | MAC (38 bits) |
|---|---|---|
| Actual | 165.213.173.181 | 00-00-F0-21-80-E9 |
| Virtual-1 | 165.213.173.182 | 66-DD-01-21-80-E9 |
| Virtual-2 | 165.213.173.183 | 66-DD-FF-21-80-E9 |

In Table 1, the actual IP address and the MAC address are the IP address and the MAC address allocated to the NIC.

The IP address corresponds to a hostname while the MAC address is allocated in the manufacturing stage of the NIC.

Table 2 shows the example of the MAC address.

TABLE 2

|  | Vendor (3 bytes) | Serial (3 bytes) |
|---|---|---|
| Samsung | 00-00-f0 | 21-80-E9 |
| Intel | 00-90-27 | 39-07-EA |
| DEC | aa-00-00 | 65-38-40 |

As shown in Table 2, all the MAC addresses are classified into a vendor code of 3 bytes and a serial code of 3 bytes. That is, each vendor has a different code. Since the number of manufacturers that can be expressed in a vendor code is much larger than that of the vendors which exist actually, unallocated vendor codes can be used (hereinafter referred to as a virtual vendor code). In the example listed in Table 1, 66-DD-xx is used as a virtual vendor code. In addition, the MAC address obtained by combination of a virtual vendor code and a serial code is referred to as a virtual MAC address.

In the apparatus shown in FIG. 2, only the IP corresponding to a host name is mapped to the MAC of the corresponding NIC. The remaining virtual IPs are mapped to virtual MAC addresses and the mapping order is determined by the order of the virtual IP address occurrence. That is, the virtual IP addresses are allocated in the order of occurrence of applications that access the Ethernet using the TCP/IP protocol and virtual MAC addresses are mapped to the allocated IP addresses. Out of the IP addresses of 32 bits in the host, the final byte (8 bits) is an internal address that can be set up by a user. Therefore, if the final byte is allocated only one time, it can be used internally by the host.

If the ARP processor 208 receives the Arp Request frame of the actual IP, the processor sends the AT Reply including the actual MAC. If the ARP processor receives the Arp Request frame of a virtual IP, the processor sends the AT Reply including the virtual MAC.

For example, in Table 1, when the ARP processor receives the Arp Request frame of the actual IP address (165.213.173.181), the processor sends the Arp Reply including the actual MAC (00-00-F0-21-80-E9). If the ARP processor receives the Arp Request frame of a virtual-1 (IP165.213.173.182), the processor sends the Arp Reply including the virtual MAC (66-DD-01-21-80-E9).

Several IP addresses can be allocated to one NIC. Since the apparatus and the method for allocating IP addresses according to the present invention operate in the same way as the actual mode, loopback is not required unlike the virtual IP. Therefore, network protocol programs can be tested easily.

As described above, since a plurality of IP addresses can be allocated to one NIC in the IP address allocation method and the apparatus according to the present invention, as many NICs as required IP addresses are not necessary and cost-effectiveness can be achieved.

What is claimed is:

1. A method for allocating multiple Internet Protocol (IP) addresses to a Network Interface Card (NIC) which has a unique Media Access Control (MAC) address comprising vendor code and serial code in a host, the method comprising:

setting up a virtual Media Access Control (MAC) address by combining a virtual vendor code which is not allocated to vendors and a serial code;

mapping the virtual MAC address with one of internal addresses of actual IP addresses allocated to a host; and allocating the mapped internal address and the virtual MAC address to an application that requests an IP protocol, wherein if an Address Resolution Protocol (ARP) processor receives an ARP Request with respect to an actual IP address that is allocated to the NIC, then the ARP processor sends an ARP Reply including the actual MAC address, or sends an ARP Reply including a virtual MAC address if the ARP processor receives an ARP Request with respect to an internal IP address that is mapped to the virtual MAC.

2. The method of claim 1, wherein the mapping step comprises mapping multiple virtual MAC addresses with internal addresses of actual IP addresses, and the allocating step comprises allocating the mapped virtual MAC addresses and internal addresses of actual IP addresses to applications that request IP protocols in the order of application occurrence.

3. A host for accessing an Ethernet using a Network Interface Card (NIC) which has a unique Media Access Control (MAC) address comprising vendor code and serial code, comprising:

an Internet Protocol (IP) processor interfacing with a controller that has an IP-to-Media Access Control (IP-MAC) table where there are mapped virtual MAC address and one of internal addresses of actual IP addresses;

the controller for allocating the virtual MAC address and the internal address of actual IP addresses listed in the IP-MAC table in response to an IP address request from the IP processor; and an ARP processor, wherein if the ARP processor receives an ARP Request with respect to an actual IP address that is allocated to the NIC, then the ARP processor sends an ARP Reply including the actual MAC address, or sends an ARP Reply including a virtual MAC address if the ARP processor receives an ARP Request with respect to an internal IP address that is mapped to the virtual MAC.

wherein the virtual MAC address is created by combining a virtual vendor code which is not allocated to vendors and a serial code.

* * * * *